(12) United States Patent
Pham

(10) Patent No.: US 9,909,398 B2
(45) Date of Patent: Mar. 6, 2018

(54) OILFIELD MATERIAL MIXING AND METERING SYSTEM WITH AUGER

(71) Applicant: SCHLUMBERGER TECHNOLOGY CORPORATION, Sugar Land, TX (US)

(72) Inventor: Hau Nguyen-Phuc Pham, Houston, TX (US)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 640 days.

(21) Appl. No.: 14/306,749

(22) Filed: Jun. 17, 2014

(65) Prior Publication Data

US 2015/0361775 A1   Dec. 17, 2015

(51) Int. Cl.
| | | |
|---|---|---|
| B01F 15/02 | (2006.01) | |
| B01F 7/08 | (2006.01) | |
| E21B 43/12 | (2006.01) | |
| E21B 43/16 | (2006.01) | |
| E21B 43/267 | (2006.01) | |
| B65G 65/46 | (2006.01) | |

(52) U.S. Cl.
CPC ............. *E21B 43/12* (2013.01); *B01F 7/088* (2013.01); *B01F 15/0251* (2013.01); *B65G 65/46* (2013.01); *E21B 43/16* (2013.01); *E21B 43/267* (2013.01)

(58) Field of Classification Search
CPC ........ E21B 43/12; E21B 43/267; E21B 43/16; B65G 65/46; B01F 7/081; B01F 7/088; B01F 15/0251; B01F 15/0269; B01F 15/0289

USPC .... 366/50, 156.1–158.4, 186, 321; 414/412; 222/83

See application file for complete search history.

(56) References Cited

U.S. PATENT DOCUMENTS

| | | | | |
|---|---|---|---|---|
| 384,656 | A * | 6/1888 | Weber et al. | A23G 1/10 241/143 |
| 1,433,865 | A * | 10/1922 | Wolf | B01F 7/087 162/59 |
| 1,977,515 | A * | 10/1934 | Klippel | B29C 47/38 366/144 |
| 2,100,599 | A * | 11/1937 | Schulthess | B01F 9/0032 209/284 |
| 3,224,609 | A * | 12/1965 | Dietert | B65B 69/0008 222/83 |

(Continued)

FOREIGN PATENT DOCUMENTS

JP    2002-186872    *  7/2002

*Primary Examiner* — Charles Cooley
(74) *Attorney, Agent, or Firm* — Michael L. Flynn; Rachel E. Greene; Robin Nava

(57) ABSTRACT

An oilfield material reservoir comprises a body and a base connected to and positioned beneath the body. The body has an upper end, a lower end, a sidewall having a first side and a second side extending between the upper end and the lower end forming a recess, and a partition positioned within the recess adjacent to the lower end and extending between the first and second sides of the sidewall. The base has a discharge opening formed within the lower side, and a plurality of augers extending between the first and second ends. The plurality of augers have opposing-hand flights configured to drive an oilfield material toward the discharge opening of the base.

21 Claims, 7 Drawing Sheets

(56) References Cited

U.S. PATENT DOCUMENTS

| | | | | |
|---|---|---|---|---|
| 3,421,740 A * | 1/1969 | Behrens | ............... | A01D 90/105 |
| | | | | 366/186 |
| 3,557,979 A * | 1/1971 | Zortman | ................ | B65G 65/46 |
| | | | | 222/316 |
| 3,604,600 A * | 9/1971 | Taupin | ................... | B65G 65/46 |
| | | | | 222/271 |
| 3,724,721 A * | 4/1973 | Barr | .................... | B65B 69/0008 |
| | | | | 222/83.5 |
| 3,785,512 A * | 1/1974 | Gatz | ...................... | B65G 65/46 |
| | | | | 222/52 |
| 3,884,375 A * | 5/1975 | Schott, Jr. | ........... | B65B 69/0008 |
| | | | | 100/98 R |
| 3,948,402 A * | 4/1976 | Schott, Jr. | ........... | B65B 69/0008 |
| | | | | 100/98 R |
| 4,040,571 A * | 8/1977 | Lindeborg | .............. | B02C 19/22 |
| | | | | 241/135 |
| 4,197,942 A * | 4/1980 | Gacki | ................ | B01F 13/1055 |
| | | | | 206/219 |
| 4,759,633 A * | 7/1988 | Schmid | .................. | B29B 7/426 |
| | | | | 222/139 |
| 4,941,131 A * | 7/1990 | Daly | ................ | B01F 15/00032 |
| | | | | 134/168 R |
| 5,005,980 A * | 4/1991 | Zimmerman | ....... | B01F 7/00925 |
| | | | | 241/101.8 |
| 5,299,888 A * | 4/1994 | Wysong | ................ | B65G 65/46 |
| | | | | 406/67 |
| 5,352,035 A * | 10/1994 | Macaulay | ............... | B01F 7/087 |
| | | | | 366/15 |
| 5,375,925 A * | 12/1994 | Elkin | .................... | B28C 5/4282 |
| | | | | 366/156.2 |
| 5,630,944 A * | 5/1997 | Terblanche | ............. | B01F 7/081 |
| | | | | 210/205 |
| 5,967,655 A * | 10/1999 | Hills | ....................... | B28C 9/006 |
| | | | | 366/156.2 |
| 6,007,272 A * | 12/1999 | Macku | ................ | E01C 19/1077 |
| | | | | 366/319 |
| 6,099,205 A * | 8/2000 | Macku | ................ | E01C 19/1077 |
| | | | | 404/101 |
| 6,267,497 B1 * | 7/2001 | Rhee | ....................... | B01F 7/081 |
| | | | | 241/260.1 |
| 6,293,318 B1 * | 9/2001 | Schmidt | ............. | B65B 69/0008 |
| | | | | 141/114 |
| 6,382,826 B1 * | 5/2002 | Della Rossa | ....... | B29C 47/0801 |
| | | | | 366/100 |
| 8,337,707 B2 * | 12/2012 | Wold | ................... | B01D 21/003 |
| | | | | 210/208 |
| 8,419,266 B2 * | 4/2013 | Velayutham | .......... | B28C 7/0076 |
| | | | | 366/2 |
| 8,646,593 B2 * | 2/2014 | Andersson | .............. | E01C 19/48 |
| | | | | 198/300 |
| 9,004,742 B2 * | 4/2015 | Burke | ....................... | D21C 1/00 |
| | | | | 100/45 |
| 9,169,077 B2 * | 10/2015 | Fulara | .................... | B65G 65/46 |
| 2010/0296359 A1 * | 11/2010 | Velayutham | .......... | B28C 7/0076 |
| | | | | 366/8 |
| 2012/0298210 A1 * | 11/2012 | Pham | ..................... | B08B 9/093 |
| | | | | 137/15.04 |
| 2015/0036453 A1 * | 2/2015 | Wolford | .................... | B01F 3/12 |
| | | | | 366/151.1 |
| 2015/0203289 A1 * | 7/2015 | Farrell | ............... | B65D 88/1668 |
| | | | | 414/810 |
| 2015/0361775 A1 * | 12/2015 | Pham | ..................... | E21B 43/12 |
| | | | | 166/305.1 |

* cited by examiner

OILFIELD MATERIAL MIXING AND METERING SYSTEM WITH AUGER

TECHNICAL FIELD

The present disclosure generally relates to systems, apparatuses, or methods of mixing and metering oilfield material into fracturing fluid to be injected into a wellbore.

BACKGROUND

In hydraulic fracturing, fracturing fluid is injected into a wellbore, penetrating a subterranean formation and forcing the fracturing fluid at pressure to crack and fracture the strata or rock. Proppant is placed in the fracturing fluid and thereby placed within the fracture to form a proppant pack to prevent the fracture from closing when pressure is released, providing improved flow of recoverable fluids, i.e., oil, gas, or water. The success of a hydraulic fracturing treatment is related to the fracture conductivity which is the ability of fluids to flow from the formation through the proppant pack. In other words, the proppant pack or matrix may have a high permeability relative to the formation for fluid to flow with low resistance to the wellbore. Permeability of the proppant matrix may be increased through distribution of proppant and non-proppant materials within the fracture to increase porosity within the fracture.

Some approaches to hydraulic fracture conductivity have constructed proppant clusters in the fracture, as opposed to constructing a continuous proppant pack. These methods may alternate the stages of proppant-laden and proppant-free fracturing fluids to create proppant clusters in the fracture and open channels between them for formation fluids to flow. Thus, the fracturing treatments result in a heterogeneous proppant placement (HPP) and a "room and pillar" configuration in the fracture, rather than a homogeneous proppant placement and consolidated proppant pack. The amount of proppant deposited in the fracture during each HPP stage is modulated by varying the fluid transport characteristics, such as viscosity and elasticity; the proppant densities, diameters, and concentrations; and the fracturing fluid injection rate.

Proppant placement techniques based on the fracture geometry have been developed for use during traditional proppant pack operations. However, proppant placement in HPP is considerably more challenging and the art is still in search of ways to improve the proppant placement techniques in HPP operations. In practice, a predetermined proppant pumping schedule was followed presuming the desired fracture geometry would result.

Prior to injection of the fracturing fluid, the proppant and other components of the fracturing fluid may be blended. The current state of technology for enabling existing blending equipment for performing HPP and slickwater fracturing operations relies on the use of automatic proppant concentration control based on proppant metering gate percentage opening in a gravity-fed system. Automatic proppant concentration control based on densitometer feedback is the most commonly used mode for proppant metering in conventional fracturing work, but cannot be used in certain applications due to densitometer response times. Additionally, current gate designs in existing blending equipment generally have irregular metering orifice geometries with respect to gate percentage opening that do not allow highly accurate and consistent proppant flow control. A means for achieving consistent, well-behaved proppant metering due to consistent, well-behaved metering orifice geometry for optimal performance is desirable.

Many proppant addition systems use one or more augers to supply proppant or a mixture of proppant and fluids, such as slickwater, gels, or hydrocarbons. In these systems, the proppant may be delivered to the fracturing fluid, pumps, or mixer from an oilfield material reservoir, commonly called a proppant hopper or receiver. The auger meters the proppant volumes and rates into a fluid stream or mixer. The auger may meter the proppant by calculating the known amount of proppant an auger may move at a given auger speed in revolutions per minute (rpm). The density of fracturing fluid including the proppant therefore may be determined, in auger systems, based on the rpm at which the auger is operating in combination with the density of the fracturing fluid determined prior to the addition of the proppant. Auger systems may require a larger area in order to accommodate an auger capable of providing a sufficient volume of proppant to the mixer or the fluid stream.

An alternative to the auger fed proppant addition systems is the use of a gravity fed proppant addition system. Gravity fed proppant addition systems may transfer proppant via gravity free fall to a mixer in order to be added to fracturing fluid. Metering the proppant volume in a gravity fed system may be calculated by determining the flow rate of the proppant through an orifice of a known size when the proppant is in gravity free fall through the orifice. Gravity fed systems may also employ the use of pressurization to aid in transferring proppants into the fluid stream or mixer. Pressurization methods in gravity fed systems may include pressurizing the proppant container subject to the gravity feed or utilizing a venturi effect where a smaller diameter pipe is connected to a larger diameter pipe to draw the proppant from the proppant container into the mixer or fluid stream. Gravity fed systems may require a smaller area, as they may not employ an auger.

Gravity fed proppant addition systems may use automatic proppant concentration control based on the orifice of known size, often called a metering gate. Blending equipment has been adapted for slickwater fracturing jobs by use of automatic proppant concentration control based on the metering gate percentage opening in the gravity fed proppant addition system. This automatic proppant concentration control may be called Auto-Concentration in Gate Percentage Mode. As previously stated, automatic proppant concentration control may be based on densitometer feedback; however densitometer feedback may not be an effective control mechanism for slickwater applications due to the inability of densitometers to differentiate between the density of low proppant concentration slurries common to slickwater fracturing and the density of the base fluid carrier itself.

Bins and hoppers with highly tapered geometries may not successfully be used with fibrous materials without the oilfield materials bridging and plugging the narrower end of the hopper. There currently exists no means in any industry of storing several thousand pounds of oilfield material in a large bin of wide cross sectional area able to transfer the material directly from such a bin through a conduit of a smaller cross sectional area.

SUMMARY

This summary is provided to introduce a selection of concepts that are further described in the detailed description. This summary is not intended to identify key or essential features of the claimed subject matter, nor is it intended to be used as an aid in limiting the scope of the claimed subject matter.

Embodiments herein relate to an oilfield material reservoir including a body with an upper end, a lower end, a sidewall having a first side and a second side opposite the first side and extending between the upper end and the lower end forming a recess, and a partition positioned within the recess adjacent to the lower end and extending between the first and second sides of the sidewall; and a base positioned adjacent to and beneath the body, the base having an upper side, a lower side opposite the upper side, a first end, a second end opposite the first end, a discharge opening formed within the lower side, and a plurality of augers having opposing-hand flights configured to drive an oilfield material toward the discharge opening of the base.

Embodiments herein relate to method including introducing an oilfield material into an oilfield material reservoir having a body and a base positioned beneath the body, the body having an upper end, a lower end, a sidewall having a first side and a second side and extending between the upper end and the lower end forming a recess, and a partition positioned within the recess adjacent to the lower end and extending between the first and second sides of the sidewall, the base having a discharge opening formed within a lower side; and directing the oilfield material toward the discharge opening of the base via a plurality of augers.

DETAILED DESCRIPTION

At the outset, it should be noted that in the development of any such actual embodiment, numerous implementation—specific decisions will be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. In addition, the composition used/disclosed herein can also comprise some components other than those cited. In the summary and this detailed description, each numerical value should be read once as modified by the term "about" (unless already expressly so modified), and then read again as not so modified unless otherwise indicated in context. Also, in the summary and this detailed description, it should be understood that a concentration range listed or described as being useful, suitable, or the like, is intended to include any concentration within the range, including the end points, is to be considered as having been stated. For example, "a range of from 1 to 10" is to be read as indicating each possible number along the continuum between about 1 and about 10. Thus, even if specific data points within the range, or even no data points within the range, are explicitly identified or refer to a few specific, it is to be understood that the inventor appreciates and understand that any data points within the range are to be considered to have been specified, and that the inventor possessed knowledge of the entire range and all points within the range.

The statements made herein merely provide information related to the present disclosure, and may describe some embodiments illustrating the disclosure.

Figure 1:
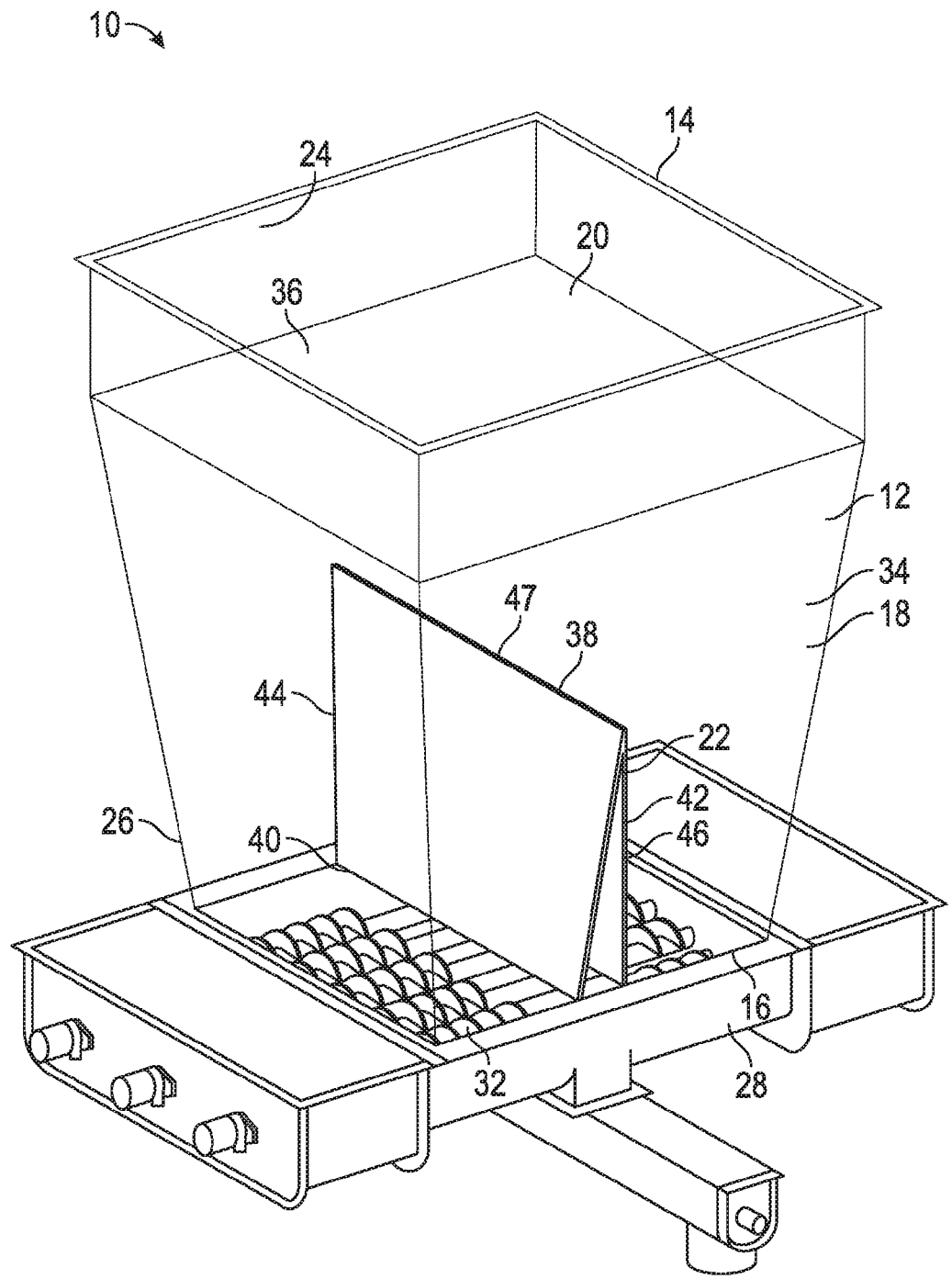
FIG. 1 shows a perspective partial phantom view of an oilfield material reservoir constructed in accordance with the present disclosure.
Figure 2:
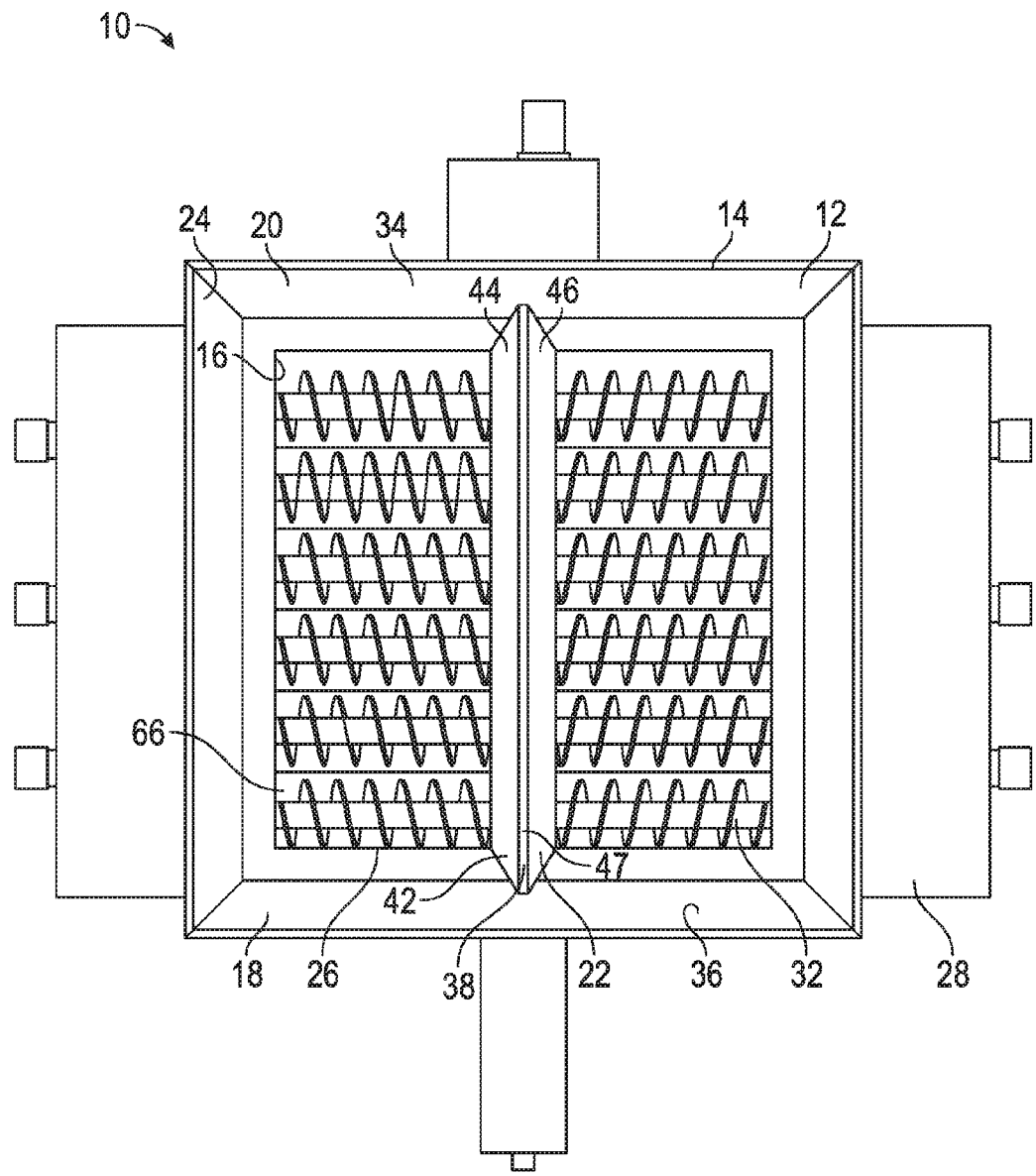
FIG. 2 shows a top plan view of the oilfield material reservoir of FIG. 1.

Referring now to FIGS. 1 and 2, shown therein is an oilfield material reservoir 10, or hopper, constructed in accordance with the inventive concepts disclosed herein. The oilfield material reservoir 10 enables storage and feeding of an oilfield material, such as a fiber, without bridging of the fiber material within the oilfield material reservoir 10. The fiber may be introduced into the oilfield material reservoir 10 in either a fibrous form or in an agglomerated form in which fiber may be bound together by a water soluble binder. The oilfield material reservoir 10 is provided with a body 12 configured to receive an oilfield material, such as a fibrous material, from a feeding unit such as a truck, manually fed oilfield material sacks, or other suitable oilfield material storage and feeding devices, for example. The body 12 has an upper end 14, a lower end 16, a sidewall 18 extending between the upper end 14 and the lower end 16 defining a recess 20, and a partition 22 extending across the recess 20. The sidewall 18 and the partition 22 may be constructed integrally as a unit, or constructed of different pieces which are connected together. The upper end 14 of the body 12 at least partially surrounds and thereby defines an opening 24 for receiving the oilfield material, and the lower end 16 of the body 12 defines a first orifice 26 for discharging the oilfield material. The partition 22 may direct the flow of the oilfield material, such as a fiber, through the body 12 to channel the oilfield material in one or more predetermined directions within the body 12. Connected to the lower end 16 of the body 12 is a base 28 which may be used to control the discharge rate of the oilfield material to a mixer (not shown). The base 28 may be connected to and positioned adjacent to and beneath the body 12. The base 28 may be provided with a discharge opening 30 and a plurality of augers 32 having opposing-hand flights configured to receive the oilfield material directed by the partition 22 and to drive the oilfield material toward the discharge opening 30 thereby controlling the discharge rate of the oilfield material to the mixer. The discharge opening 30 may be positioned centrally to the first orifice 26 and aligned with the partition 22.

Figure 3:
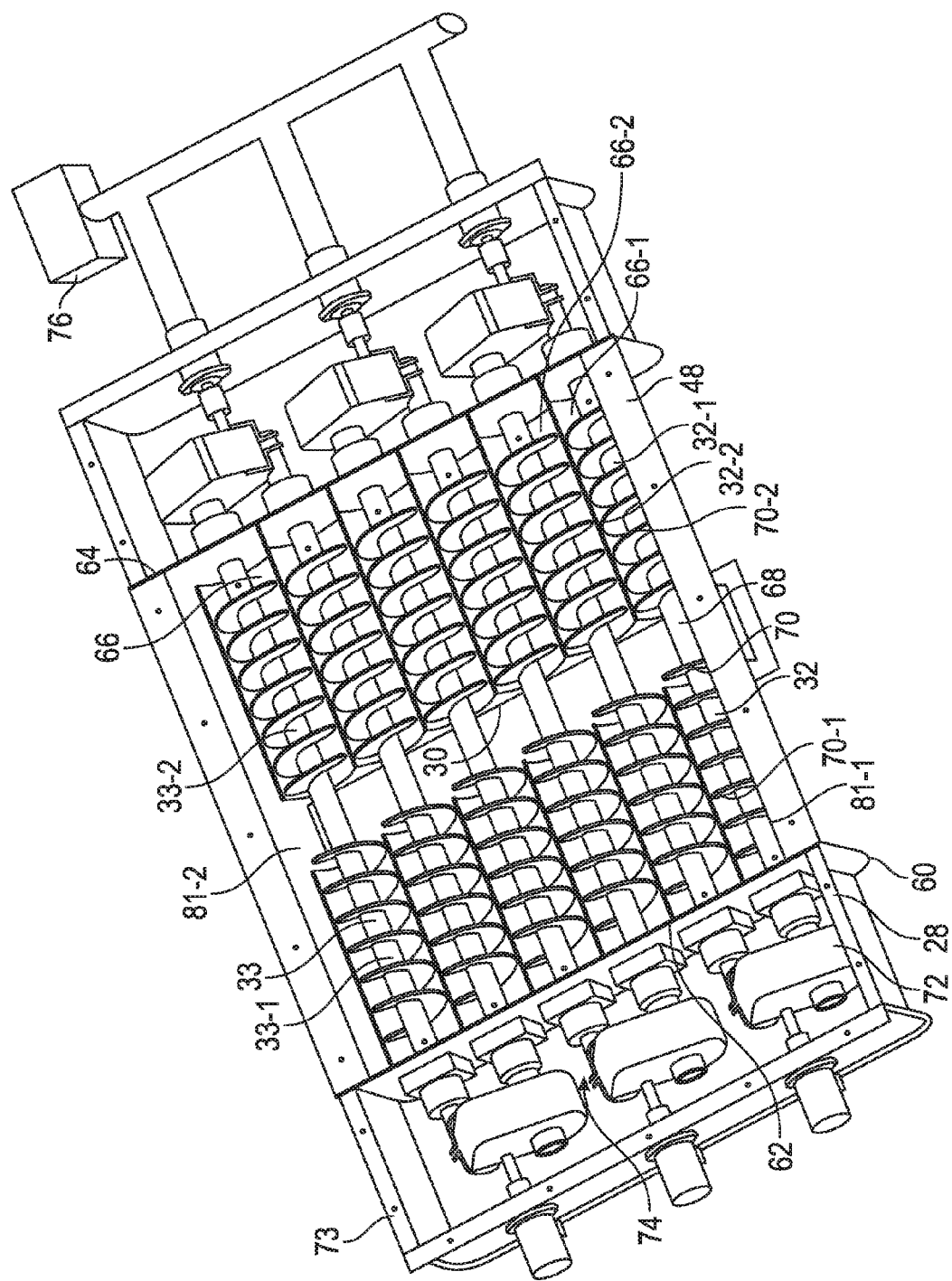
FIG. 3 shows a perspective view of a base of the oilfield material reservoir of FIG. 1.

The sidewall 18 of the body 12 may be configured with a first side 34 and a second side 36 which taper from above the partition 22 to the lower end 16. As shown in FIGS. 1-3, the first side 34 and second side 36 may taper from substantially near the upper end 14 of the body 12 to the lower end 16 of the body 12. The tapering of the first side 34 and second side 36 facilitates directing a flow of the oilfield material, such as a fiber, from the opening 24, through the recess 20, to the first orifice 26. Although shown in FIGS. 1-3 with the first side 34 and second side 36 as tapering, it will be understood that one or more sides of the sidewall 18 of the body 12 may be tapered between the upper end 14 and the lower end 16 to facilitate the flow of oilfield material from the opening 24, through the recess 20, to the first orifice 26. The flow of oilfield material through the recess 20 and the first orifice 26 may be a gravity-fed flow where oilfield material travels to the first orifice 26 by gravity free fall to the base 28 to be distributed through the discharge opening 30 of the base 28 by the plurality of augers 32.

In some embodiments, the sidewall 18 of the body 12 may be configured such that the first side 34 and the second side 36 extend vertically from the upper end 14 to the lower end 16 without tapering. The vertical extension of the first and second sides 34 and 36 may facilitate oilfield material flow from the upper end 14 through the recess 20 to the first orifice 26. It will be understood that where the first and second sides 34 and 36 extend vertically from the upper end 14 to the lower end 16, other sides in addition to the first and second sides 34 and 36 which also form the sidewall 18 of the body 12 may also extend vertically from the upper end 14 to the lower end 16. In this embodiment, the flow of oilfield material through the recess 20 and to the first orifice 26 may be a gravity-fed flow where oilfield material travels to the first orifice 26 by gravity free fall to the base 28 to be distributed through the discharge opening 30 by the plurality of augers 32. The vertical orientation of the first and second sides 34 and 36 may aid in preventing bridging of a fibrous material while passing through the recess 20.

The first orifice 26, defined by the lower end 16 of the body 12, as shown in FIGS. 1 and 2 is in the shape of a square. However, it will be understood by one skilled in the art that the first orifice 26 may form the shape of a trapezoid, triangle, square, rectangle, or other polygonal. The oilfield material flow through the first orifice 26 may be regulated by the plurality of augers 32 of the base 28 that are positioned below the body 12. Regulation of the flow rate may involve rotation of the plurality of augers 32 at varying speeds to control the flow of oilfield material through the first orifice 26 and thereby the concentration, amount, or other operational aspects of the slurry created by the addition of the oilfield material to a liquid component.

The partition 22 may be provided to direct a flow from the opening 24 of the body 12 through the first orifice 26 to the plurality of augers 32 such that the oilfield material is transferred to the discharge opening 30 of the base 28 by the plurality of augers 32 as opposed to a direct transfer via gravity. The partition 22 may be provided with an upper end 38 and a lower end 40. As shown, in one embodiment, the partition 22 may be provided as a chevron 42 having a first partition wall 44 and a second partition wall 46, with the upper end 38 forming an apex 47 of the chevron 42 opposite the lower end 40. In another embodiment, the partition 22 may be formed from a single piece of material and provided as a solid partition 22 in a chevron, airfoil, or other suitable shape. The partition 22 may be positioned within the recess 20 such that the partition 22 extends between the first side 34 and the second side 36 and such that the lower end 40 of the partition 22 is adjacent to the lower end 16 of the body 12. As shown in FIGS. 1 and 2, the partition 22 may be positioned within the recess 20 and above the base 28 such that the partition 22 is above the discharge opening 30 of the base 28 to prevent the oilfield material from transferring directly to the discharge opening 30 without manipulation by the plurality of augers 32. Positioned above the discharge opening 30, the partition 22 may cover at least a portion of the discharge opening 30. The partition 22 may be formed from metals, plastics, composites, or any other suitable materials. The partition 22 may be connected to the first and second sides 34 and 36 by brazing, welding, adhesive, mechanical connectors, or any other suitable connection mechanism.

Figure 1A:
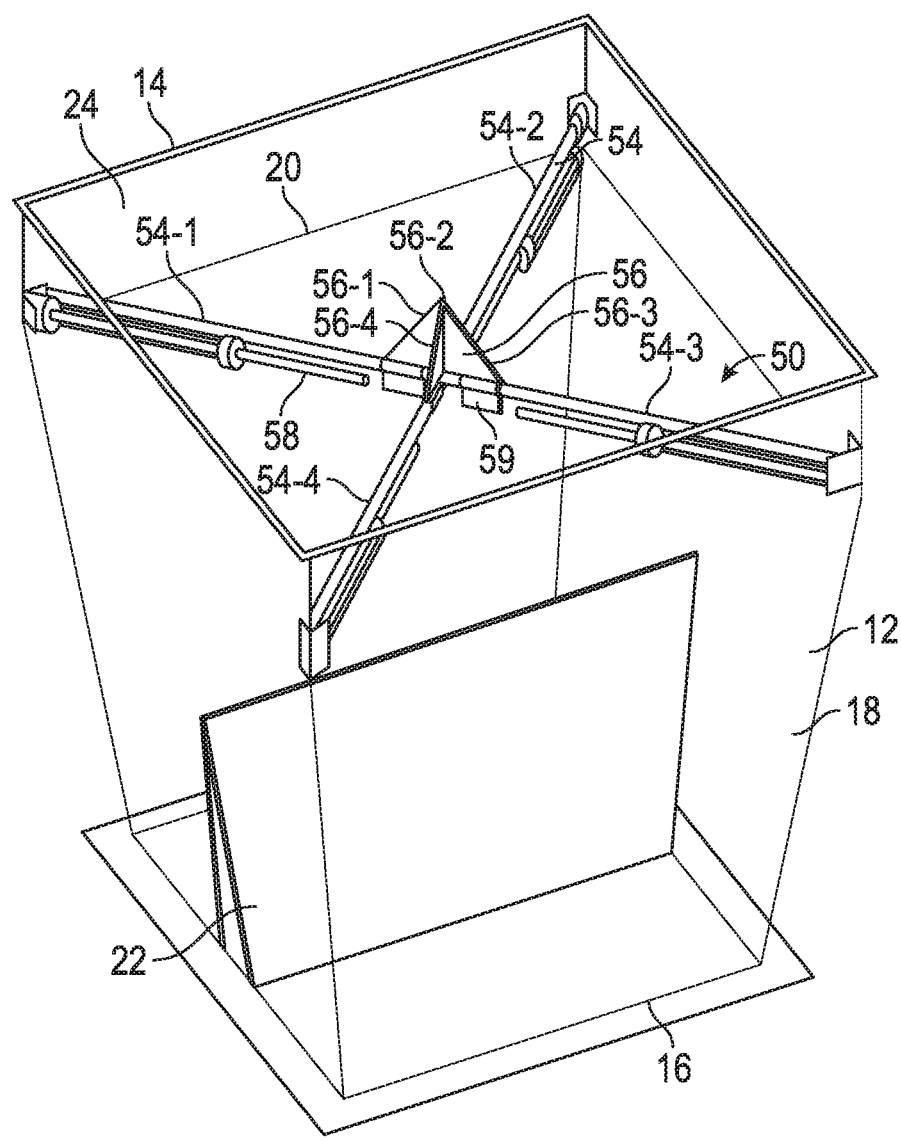
FIG. 1A shows a perspective partial phantom view of one embodiment of the oilfield material reservoir of FIG. 1 with an opener assembly in accordance with the present disclosure.
Figure 1B:
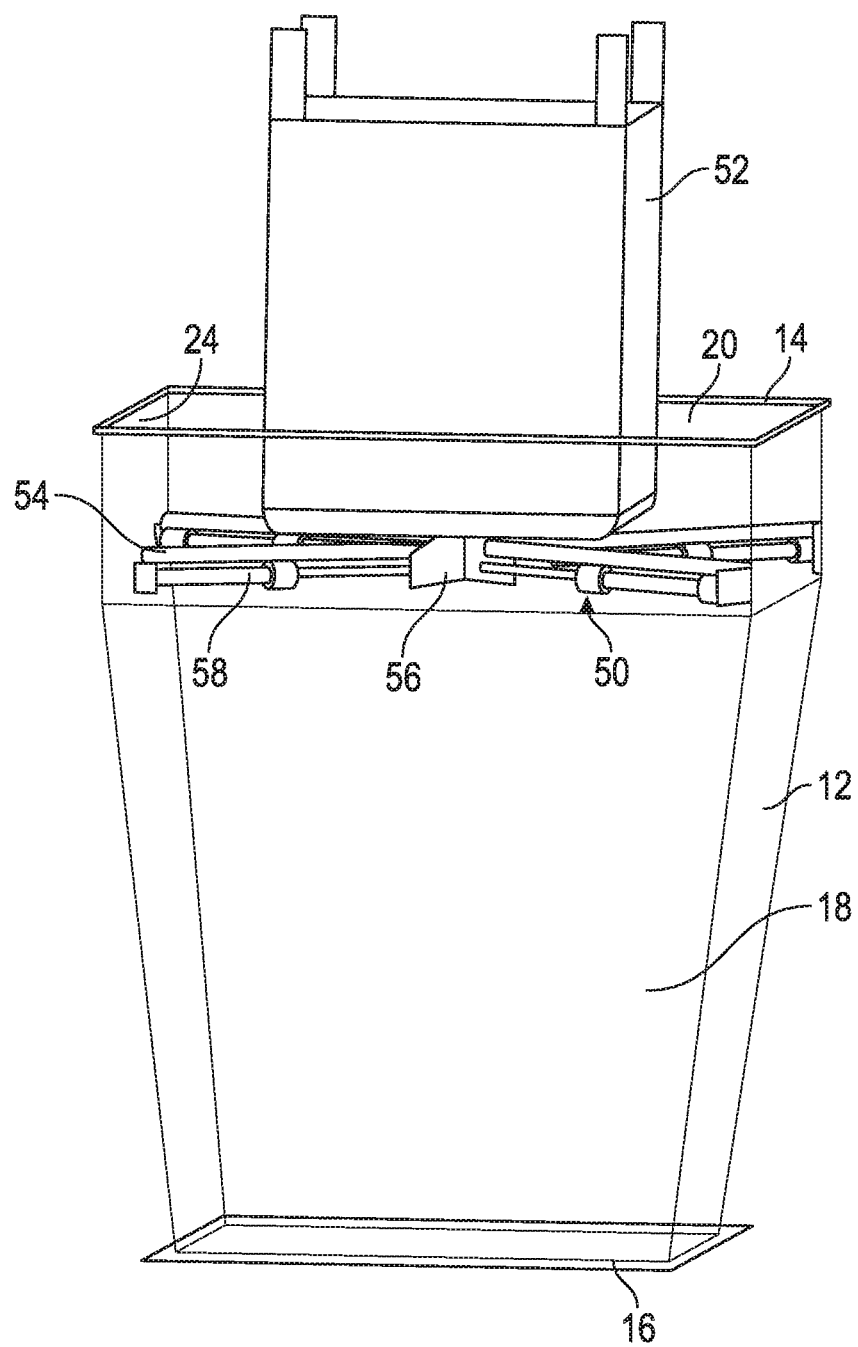
FIG. 1B shows a perspective partial phantom view of the oilfield material reservoir and opener assembly of FIG. 1A being used to open a bag in accordance with the present disclosure.

In one embodiment, shown in FIGS. 1A and 1B, the oilfield material reservoir 10 may be provided with an opener assembly 50 positioned proximate to the upper end 14 of the body 12 within the recess 20. The opener assembly 50 may be used to open sacks 52, which may also be referred to as oilfield material receptacles, which may be loaded onto and at least partially supported by the opener assembly 50. The opener assembly 50 may be provided with one or more blade support member 54, one or more blade 56 operably connected to certain of the one or more blade support members 54, and one or more blade driver 58 operably connected to certain of the one or more blade 56 and configured to move the one or more blade 56 along the one or more blade support member 54.

As shown in FIGS. 1A and 1B, the one or more blade support member 54 is shown as a single cross brace member having four shafts 54-1-54-4 extending between four opposing corners bounding the recess 20 and a medial region of the recess 20. The one or more blade 56 is configured to move toward and away from the medial region of the recess 20 proximate to the upper end of the body 12. For example, the one or more blade 56 may be moved from the first side 34 toward the second side 36 of the sidewall 18 across the medial region of the recess 20, in embodiments where the blade support member 54 extends between the first side 34 and the second side 36 of the sidewall 18. However, it will be understood by one skilled in the art that other configurations of the blade support member 54 can be used. The blade support member 54 may be constructed of metals (steel, aluminum, etc.), plastics, composites, or any other suitable material capable of being configured to be operably connected to at least one blade and capable of supporting at least a portion of a sack 52.

As shown, the one or more blade 56 is provided as four blades 56-1-56-4, with each of the four blades 56-1-56-4 connected to one of the four shafts 54-1-54-2, respectively. However, it will be understood by one skilled in the art that more or fewer blades 56 may be provided and more or fewer blades 56 may be operably connected to the shafts 54-1, 54-2, 54-3, and 54-4 of the blade support member 54 and used to open the sacks 52. The one or more blade 56 may be constructed from metals, plastics, composites, or any other suitable material capable of opening, cutting, or separating a lower end of the sack 52 to release the contents of the sack 52 into the recess 20. The one or more blade 56 may be shaped as a triangle, circle, semicircle, or any other suitable shape and be provided with a mounting element 59 configured to operably connect the one or more blade 56 to the one or more blade support member 54 such that the one or more blade support member 54 serves as a rail on which the one or more blade 56 may slide at least a portion of a length of the one or more blade support member 54.

The one or more blade driver 58, as shown, is provided as four blade drivers 58-1-58-4, with each of the four blade drivers 58-1-58-4 operably connected to the four blades 56-1-56-4, respectively and the blade support member 54. However, it will be understood by one skilled in the art that more or fewer blade drivers 58 may be provided. For example, in some embodiments, each blade driver 58 may drive a single blade 56 such that when the blade driver 58 is actuated the blade 56 operably connected thereto is moved. In other embodiments, a single blade driver 58 may drive a plurality of blades 56 such that when the blade driver 56 is actuated each or selected ones of the plurality of blades 56 operably connected thereto are moved. The blade driver 58 may be provided as a hydraulic cylinder, a pneumatic cylinder, a chain drive, a rack-and-pinion motor mechanism, an electric motor, or any other suitable driving mechanism capable of moving the one or more blade 56 along the one or more blade support member 54.

In use, the one or more blades 56 of the opener assembly 50 may be initially extended to the medial region of the recess 20 and the blade support member 54. The sack 52 may be lowered directly over the one or more blades 56 until seated onto the blade support member 54 and punctured by the blades 56. The sack 52 may be positioned over and onto the blades 56 via fork lift, one or more users manually positioning the sack 52, or one or more automated mechanism. The one or more blades 56 may then be retracted toward the sidewall 18 of the body 12 of the oilfield material reservoir 10 forming an enlarged opening in a bottom of the sack 52 to release the contents of the sack 52 into the oilfield material reservoir 10.

Figure 4:
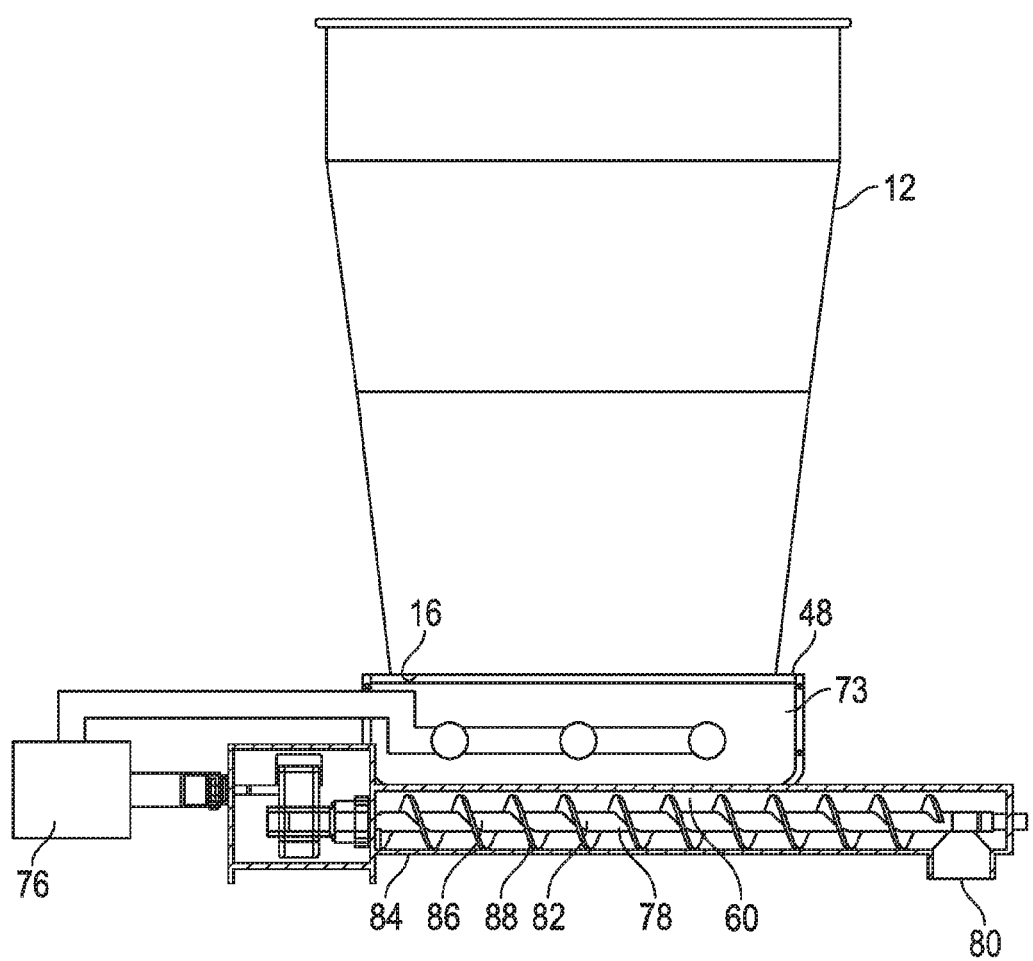
FIG. 4 shows a partial cross-sectional view of the oilfield material reservoir of FIG. 1.
Figure 5:
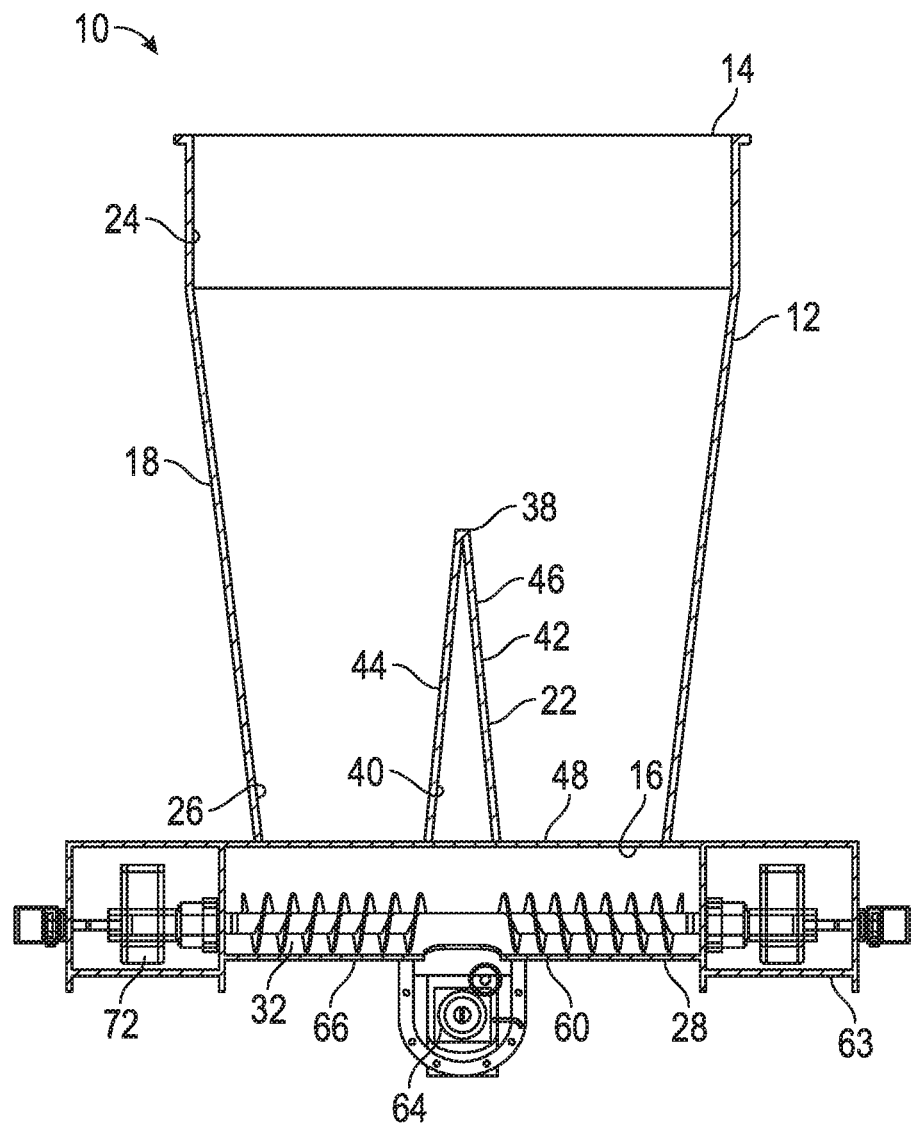
FIG. 5 shows a partial cross-sectional view of the oilfield material reservoir of FIG. 1 rotated 90° relative to FIG. 4.

Referring now to FIGS. 3-5, the base 28 may be provided with an upper side 48, a lower side 60 opposite the upper side 48, a first end 62, a second end 64 opposite the first end 62, the discharge opening 30 defined by the lower side 60, and the plurality of augers 32 extending from the first and second ends 62 and 64 and positioned between the upper and lower sides 48 and 60 above the discharge opening 30. The upper side 48 of the base 28 may be connected to the lower end 16 of the body 12, thereby enabling fluid communication between the body 12 and the base 28. In one embodiment, as shown in FIG. 3, the lower side 60 may be provided with a plurality of troughs 66 extending between the first end 62 and the second end 64 of the base 28. The plurality of troughs 66 may be positioned under the plurality of augers 32 and be sized and shaped to receive the plurality of augers 32, with each of the plurality of troughs 66 receiving one of the plurality of augers 32. For example, in one embodiment, a first auger 32-1 may be at least partially positioned within a first trough 66-1 and a second auger 32-2 may be at least partially positioned within a second trough 66-2. The plurality of augers 32 may be at least partially positioned within the plurality of troughs 66 such that the oilfield material advanced by the plurality of augers 32 may be moved without substantial build up between the plurality of troughs 66 and the plurality of augers 32. The base 28 may be formed from metal, plastic, or any other suitable material. The plurality of troughs 66 of the lower side 60 may be integral to the base 28, a separate insert connected to the lower side 60, individual trough members connected to the lower side 60 between the lower side 60 and the plurality of augers 32, as individual trough members connected together to form the lower side 60 and connected to the base 28, or any other suitable method.

The plurality of augers 32 may include a central shaft 68 and a plurality of blades 70 extending helically along at least a portion of a length of the central shaft 68. In one embodiment, as shown in FIG. 3, the plurality of blades 70 may be implemented as a first blade 70-1 on one end of the shaft 68 and a second blade 70-2 on an opposite end of the shaft, the blades 70-1 and 70-2 having opposing-hand flights. The first and second blades 70-1 and 70-2, configured with opposing-hand flights, may cause the oilfield material to be advanced toward the discharge opening 30 of the base. In this embodiment, the first blade 70-1 directs oilfield material toward the discharge opening 30 in a direction toward the second end 64 and the second blade 70-2 directs oilfield material toward the discharge opening 30 in a direction toward the first end 62. In another embodiment, the plurality of augers 32 may be formed from two auger sections 33 having a single blade 70. For example, a first auger section 33-1 may extend from the first end 62 to the discharge opening 30 and connects, above the discharge opening 30, to a second auger section 33-2 which extends from the discharge opening 30 to the second end 64 of the base 28. The blades 70 of the first and second auger sections 33-1 and 33-2 may be oriented in opposing-hand flights from one another to direct oilfield material from the respective ends 62 and 64 toward the discharge opening 30. The first and second auger sections 33-1 and 33-2 are connected together to form one of the plurality of augers 32 extending from the first end 62 to the second end 64. The plurality of augers 32 may be formed from metal, plastic, or any other suitable material capable of being exposed to the weight of the oilfield material and directing the oilfield material toward the discharge opening 30.

In one embodiment, as shown in FIG. 3, the plurality of augers 32 may extend at least partially through the first and second ends 62 and 64. One or more of the plurality of augers 32 may be connected together by a linkage 72. The linkage 72 may be provided in a linkage housing 73 connected to the first end 62, the second end 64, or both the first and second ends 62 and 64 of the base 28. As shown in FIG. 3, a plurality of linkages 72 may connect the plurality of augers 32 to form a linked system of augers 74. The linked system of augers 74 may be connected to one or more motive element 76 configured to drive each of the plurality of augers 32 simultaneously using the plurality of linkages 72. The one or more motive element 76 may be implemented as a single motive element 76 coupled to each of the shafts 68 of the plurality of augers 32 via the plurality of linkages 72 forming the linked system of augers 74. In another embodiment, the one or more motive element 76 may be implemented as a plurality of motive elements 76, where each of the plurality of motive elements 76 are coupled to one or more of shafts 68 of the plurality of augers 32. Each of the plurality of motive elements 76 may be configured to independently drive one or more of the plurality of augers 32. The one or more motive elements 76 may be implemented as a motor, engine, actuator, solenoid, pneumatic device or system, hydraulic device or system, or other suitable mechanism capable of driving the shafts 68 of the one or more of the plurality of augers 32 to direct the oilfield material from the respective ends 62 and 64 to the discharge opening 30 of the base 28.

Referring now to FIGS. 4 and 5, as shown therein, the base 28 may further be provided with a conveyor 78 positioned beneath the discharge opening 30 and configured to transfer oilfield material from the discharge opening 30 through a conveyor opening 80. The discharge opening 30 may extend from a first end 81-1 of the base 28 to a second end 81-2 of the base 28 and may overlap at least a portion of the conveyor 78. In one embodiment, the conveyor 78 may be implemented as an auger 82 at least partially housed in a channel 84 positioned below the discharge opening 30. The auger 82 may be provided with a shaft 86 and a blade 88 helically extending at least a portion of a length of the shaft 86. The channel 84 may be provided with an opening (not shown) at least partially aligned with the discharge opening 30 of the base 28 such that oilfield material directed through the discharge opening 30 by the plurality of augers 32 may be received by the channel 84 and directed by the auger 82 to the conveyor opening 80. The channel 84 may be sized and shaped to receive the auger 82 such that the blade 88 and an interior surface 85 of the channel 84 are in proximity sufficient to prevent the oilfield material from escaping the direction of the auger 82. The conveyor opening 80 may be of smaller cross-sectional area than the body 12. Although described as an auger, the conveyor 78 may be implemented as a conveyor belt, a paddle conveyor belt, or any other suitable conveyance mechanism. In one embodiment, the conveyor 78 may be coupled to the one or more motive element 76 such that a rate of conveyance of the conveyor 78 is linked to a rate of conveyance of the plurality of augers 32. In another embodiment, the conveyor 78 may be coupled to one of the plurality of motive elements 76 such that the conveyor 78 may be driven at a rate of conveyance independent from the plurality of augers 32.

In use, the oilfield material reservoir 10 may be loaded with an oilfield material, such as a fibrous material for use to form a matrix within a formation. The oilfield material may be deposited into the opening 24 at the upper end 14 of the body 12 manually or by an oilfield material feeding device. The oilfield material may travel through the body 12 contacting the partition 22 to prevent bridging of the oilfield material within the body 12. After encountering the partition 22, the oilfield material may pass through the first orifice 26 and contact the augers 32 within the base 28. The one or more motive element 76 may be engaged to drive the plurality of augers 32. The plurality of augers 32, rotating within the plurality of troughs 66, may contact and direct the oilfield material toward and into the discharge opening 30, which may be beneath the partition 22. The oilfield material may pass through the discharge opening 30 and contact the conveyor 78. In one embodiment, the oilfield material may pass into the channel 84 and contact the auger 82 of the conveyor 78. The auger 82 may direct the oilfield material through the channel 84 and discharge the oilfield material from the channel 84 through the conveyor opening 80. In one embodiment, the oilfield material, discharged through the conveyor opening 80 may pass into a blender to be mixed with a liquid component to form a slurry for oilfield fracturing operations.

The oilfield material reservoir 10 may be used to transfer and meter the oilfield material by introducing the oilfield material into the oilfield material reservoir 10. In one embodiment, the oilfield material is introduced into the oilfield material reservoir 10 by supporting an oilfield material receptacle, such as the oilfield material sack 52, and opening the oilfield material receptacle using the opener assembly 50 described in detail above. After introducing the oilfield material into the oilfield material reservoir 10, the oilfield material is prevented from bridging by at least a portion of the oilfield material contacting the partition 22 within the recess 20 of the body 12. The oilfield material may then be directed toward the discharge opening 30 of the base 28 by the plurality of augers 32. Once driven by the plurality of augers 32, the oilfield material may be discharged through the discharge opening 30. In one embodiment, the oilfield material, after being discharged through the discharge opening 30 may be received by the conveyor 78 described above. The conveyor 78 may then pass the oilfield material through the channel 84 and out of the oilfield material reservoir 10 through the conveyor opening 80.

The preceding description has been presented with reference to some embodiments. Persons skilled in the art and technology to which this disclosure pertains will appreciate that alterations and changes in the described structures and methods of operation can be practiced without meaningfully departing from the principle, and scope of this application. Accordingly, the foregoing description should be read as consistent with and as support for the following claims, which are to have their fullest and fairest scope.

The scope of patented subject matter is defined by the allowed claims. Moreover, the claim language is not intended to invoke paragraph six of 35 USC §112 unless the exact words "means for" are used. The claims as filed are intended to be as comprehensive as possible, and no subject matter is intentionally relinquished, dedicated, or abandoned.

What is claimed is:

1. An oilfield material reservoir, comprising:
   a body with an upper end, a lower end, a sidewall having a first side and a second side opposite the first side and extending between the upper end and the lower end forming a recess, and a partition positioned within the recess adjacent to the lower end and extending between the first and second sides of the sidewall; and
   a base positioned adjacent to and beneath the body, the base having an upper side, a lower side opposite the upper side, a first end, a second end opposite the first end, a discharge opening formed within the lower side, and a plurality of augers,
   wherein each of the augers have a central shaft extending across the body from the first side to the second side of the body, the augers having opposing-hand flights on opposite ends of the central shaft, the flights of the augers configured to drive an oilfield material from the first and second sides of the body toward the discharge opening of the base.

2. The oilfield material reservoir of claim 1, wherein the partition is aligned with the discharge opening.

3. The oilfield material reservoir of claim 2, wherein the partition and the discharge opening are parallel.

4. The oilfield material reservoir of claim 1, wherein the partition includes a first partition wall and a second partition wall which are connected together in the shape of a chevron, an apex of the chevron positioned above the lower end of the body.

5. The oilfield material reservoir of claim 4, wherein the partition is formed from a single piece of material.

6. The oilfield material reservoir of claim 1, further comprising an opener assembly positioned proximate to the upper end of the body adjacent to the recess, the opener assembly having one or more blade support member, one or more blade operably connected to certain of the one or more blade support member, and a blade driver operably connected to certain of the one or more blade and configured to move the one or more blade along the one or more blade support member.

7. The oilfield material reservoir of claim 6, wherein the blade support member is configured as a cross brace member.

8. The oilfield material reservoir of claim 1 further comprising a plurality of troughs sized and shaped to receive the plurality of augers, respectively and configured to prevent an oilfield material transferred by the plurality of augers from disrupting a flow of the oilfield material toward the discharge opening of the base, wherein a first auger is positioned in a first trough and a second auger is positioned in a second trough.

9. The oilfield material reservoir of claim 1 further comprising a conveyor positioned beneath the discharge opening of the base where the discharge opening extends from a first end of the base to a second end of the base and overlaps at least a portion of the conveyor.

10. An oilfield material reservoir, comprising:
 a body with an upper end, a lower end, a sidewall having a first side and a second side opposite the first side and extending between the upper end and the lower end forming a recess, and a partition positioned within the recess adjacent to the lower end and extending between the first and second sides of the sidewall;
 a base positioned beneath the body, the base having a lower end at least partially surrounding a discharge opening, and a plurality of augers, the wherein each of the plurality of augers have a central shaft extending across the body from the first side to the second side of the body, the augers having opposing-hand flights on opposite ends of the central shaft, the flights of the augers configured to drive oilfield material from the first and second sides of the body toward the discharge opening of the base; and
 one or more motive elements configured to cause one or more of the central shafts of the plurality of augers to rotate thereby driving the oilfield material toward the discharge opening of the base.

11. The oilfield material reservoir of claim 10, wherein the partition is aligned with the discharge opening.

12. The oilfield material reservoir of claim 11, wherein the partition and the discharge opening are parallel.

13. The oilfield material reservoir of claim 10, wherein the partition is formed from a first partition wall and a second partition wall connected together in a shape of a chevron having an apex positioned opposite to the lower end of the body.

14. The oilfield material reservoir of claim 10, wherein the body has an upper end, and further comprising an opener assembly positioned proximate to the upper end of the body and adjacent to the recess, the opener assembly having one or more blade support member, one or more blade operably connected to certain of the one or more blade support member, and a blade driver operably connected to certain of the one or more blade and configured to move the one or more blade along the one or more blade support member.

15. The oilfield material reservoir of claim 10, wherein the one or more motive element is a single motive element coupled to the plurality of augers forming a linked system of augers and configured to drive each of the plurality of augers simultaneously.

16. The oilfield material reservoir of claim 10, wherein the one or more motive element is a plurality of motive elements, each of the plurality of motive elements coupled to one of the plurality of augers and each of the plurality of motive elements configured to independently drive one of the plurality of augers.

17. The oilfield material reservoir of claim 10 further comprising a plurality of troughs sized and shaped to receive the plurality of augers, respectively and configured to prevent an oilfield material transferred by the plurality of augers from disrupting a flow of the oilfield material toward the discharge opening of the base, wherein a first auger is positioned in a first trough and a second auger is positioned in a second trough.

18. The oilfield material reservoir of claim 10 further comprising a conveyor coupled to the one or more motive element and positioned beneath the discharge opening of the base and configured to transfer an oilfield material transferred through the discharge opening through a conveyor opening having a smaller cross-sectional area than the body.

19. A method, comprising:
 introducing an oilfield material into an oilfield material reservoir having a body and a base positioned beneath the body, the body having an upper end, a lower end, a sidewall having a first side and a second side and extending between the upper end and the lower end forming a recess, and a partition positioned within the recess adjacent to the lower end and extending between the first and second sides of the sidewall, the base having a discharge opening formed within a lower side, the body having a plurality of augers disposed therein, each of the augers having a central shaft extending across the body from the first side to the second side of the body, the augers having opposing-hand flights on opposite ends of the central shaft, the flights of the augers configured to drive an oilfield material from the first and second sides of the body toward the discharge opening of the base; and
 rotating the central shafts of the augers while introducing the oilfield material and directing the oilfield material toward the discharge opening of the base via the flights of the plurality of augers.

20. The method of claim 19, further comprising actuating an opener assembly to open an oilfield material receptacle supported at a location proximate to an upper end of the body adjacent to the recess to introduce oilfield material into the oilfield material reservoir.

21. The method of claim 19, further comprising receiving the oilfield material, discharged through the discharge opening, onto a conveyor coupled to one or more motive element and positioned beneath the discharge opening of the base and configured to transfer the oilfield material discharged through the discharge opening through a conveyor opening having a smaller cross-sectional area than the body.

* * * * *